Sept. 2, 1952 A. C. HOWARD 2,608,877
TRAVEL-SPEED REDUCTION GEARING FOR TRACTORS
Filed Oct. 7, 1949 3 Sheets-Sheet 1

A. C. HOWARD INVENTOR.

BY *Mawhinney & Mawhinney*

ATTORNEYS.

Sept. 2, 1952      A. C. HOWARD      2,608,877
TRAVEL-SPEED REDUCTION GEARING FOR TRACTORS
Filed Oct. 7, 1949      3 Sheets-Sheet 3

INVENTOR.
A. C. HOWARD
BY
Mawhinney & Mawhinney
Attorneys

Patented Sept. 2, 1952

2,608,877

UNITED STATES PATENT OFFICE 2,608,877

TRAVEL-SPEED REDUCTION GEARING FOR TRACTORS

Arthur Clifford Howard, Upminster, England, assignor of one-half to Rotary Hoes Limited, East Horndon, England Application October 7, 1949, Serial No. 120,106
In Great Britain November 5, 1948

2 Claims. (Cl. 74—343)

For some agricultural purposes it is desirable for a tractor to be driven at less than its minimum designed speed—e. g., when being used in conjunction with a rotary cultivating machine, the latter possibly having its earth-working rotor driven from a power take-off shaft of the tractor.

In British patent specification No. 560,085 there is provided a travel-speed reduction gearing for a tractor having a shaft with a relatively fixed driving member (e. g., a worm or a spur or bevel gear) meshing a coacting driven member on a ground-engaging wheel axle.

It is the object of the present invention to provide a travel-speed reduction gearing for a tractor of the kind in which at least one ground-engaging wheel is to be driven through two aligned shafts which are interconnected by a removable sleeve and coacting splines.

According to the invention, a travel-speed reduction gearing, for a tractor of the kind set forth, includes two gear wheels mounted, by splines, to be drivingly fast with the splined shaft ends in substitution of the said sleeve, one of them being axially slidable, by selector means, between one extreme position, in which interengageable surfaces of the said gear wheels coact to couple the shafts together directly, and another extreme position in which those shafts are interconnected through layshaft gear wheels respectively meshing the two first-mentioned gear wheels, the ratio of the drive through the layshaft gear wheels providing the desired speed reduction.

In the accompanying drawings:

Figure 1 is a side elevation of a portion of a tractor of the kind to which the invention relates, the figure showing, in section, the removable sleeve which interconnects the two aligned shafts; and Figure 2 is an enlarged sectional view of the sleeve, showing the splined interconnection and, inter alia, an actuator for a clutch in the drive to a pump for the supply of a hydraulic fluid for operating an implement-lifting mechanism of the tractor.

Figure 1:
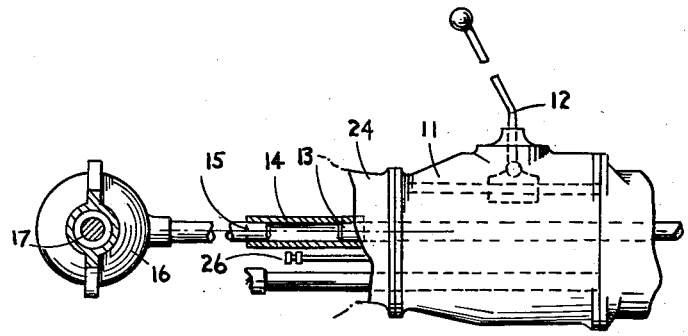
Figure 2:
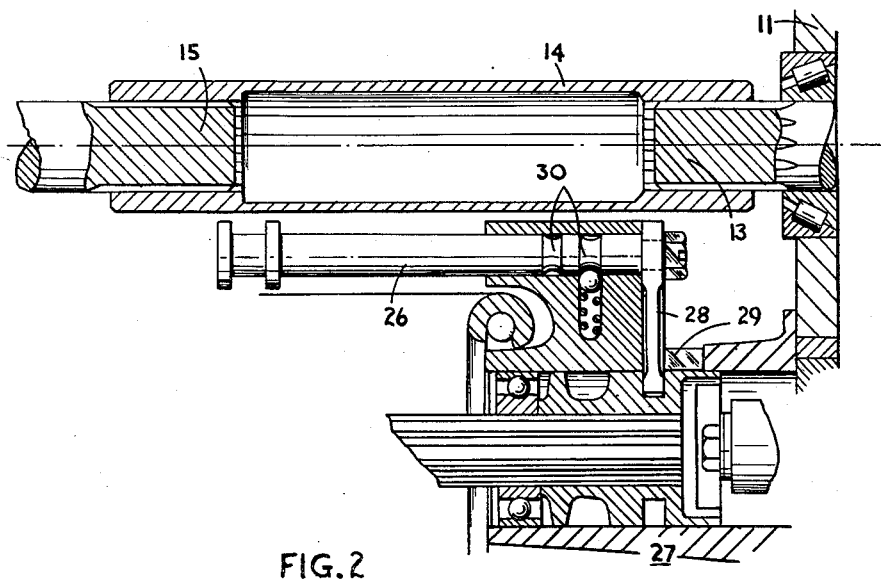

Referring to Figures 1 and 2, the tractor gear box 11, which is provided with the usual operating lever 12, has an output shaft of which a splined end 13 projects rearwardly from the rear wall. The splined end 13 is drivingly interconnected, by a sleeve 14, with an adjacent splined end 15 of the input shaft of the differential gear, which latter is indicated generally at 16, the half-shaft for driving one of the ground engaging wheels of the tractor being shown at 17.

Figure 3:
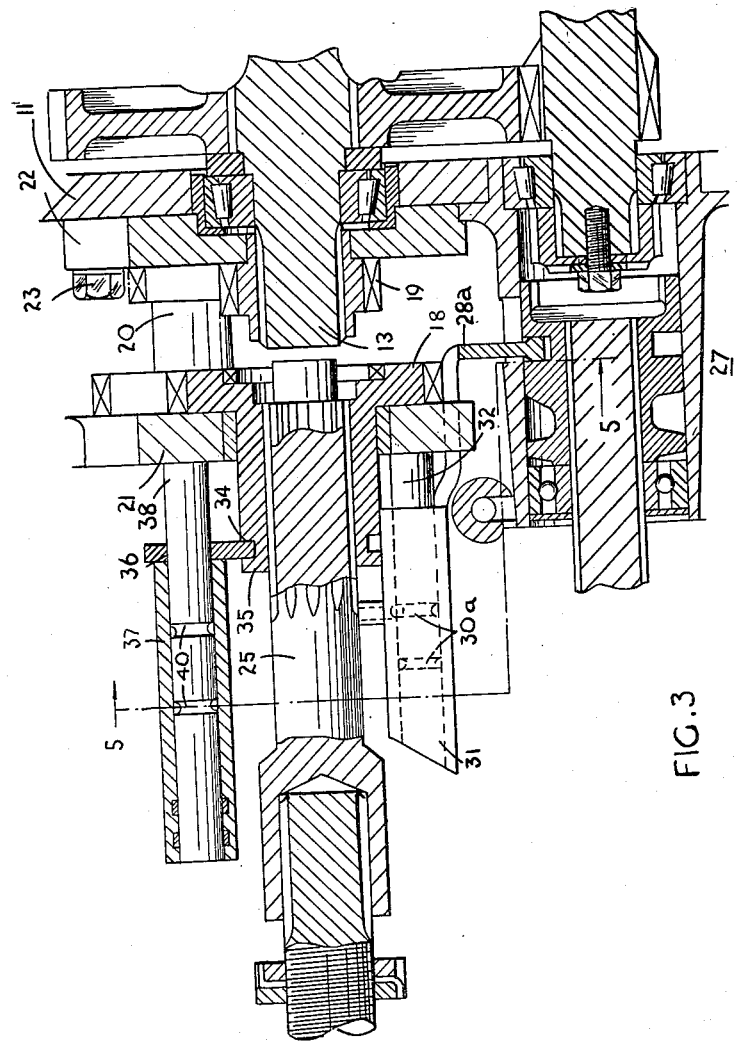
Figure 3 is a view, similar to Figure 2, but showing the reduction gear of the invention in position as substituted for the splined sleeve, the view corresponding with a section on the line 3—3 of Figure 5.
Figure 4:
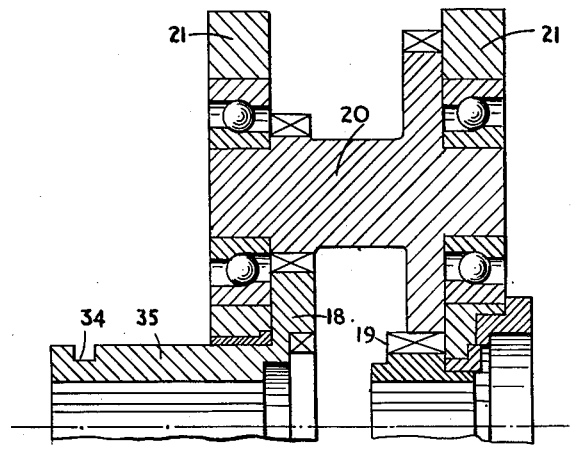
Figure 4 is an enlarged sectional view of part of the reduction gear unit which takes the place of the splined sleeve, the section being taken on the line 4—4 of Figure 5.
Figure 5:
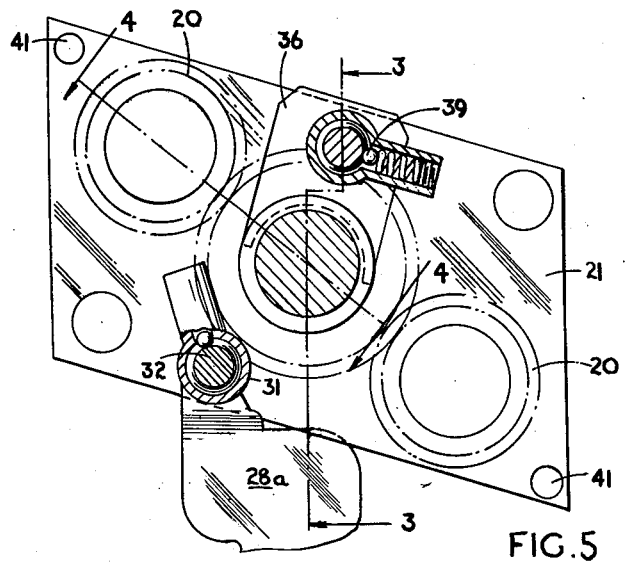
Figure 5 is an end view of the unit, the view being on the line 5—5 of Figure 3.

The travel-speed reduction gearing of the invention, see Figures 3 to 5, includes two coaxial gear wheels 18, 19, which are internally splined for connection to the splined shaft ends, and layshaft gear wheels 20. These wheels are journalled, with provision for the axial sliding of the slidable gear wheel 18, between spaced end plates 21, 22, of which the latter one is for attachment (as by bolts, one of which is shown at 23 in Figure 3) to the adjacent wall of the gear box 11. The end plates can be tied together by bolts with spacers (not shown, but passing through the holes 41—see Figure 5); or the end plate 21 could even be secured to a stationary portion of the tractor.

For incorporating the reduction gearing in such a tractor, the tractor gear casing 24 (Figure 1) is appropriately opened and the splined sleeve 14 removed. The reduction gearing of the invention is then installed and the aligned shafts returned to their original relative positions.

This condition is shown by Figure 3, in which is also shown the use of a splined extension shaft 25 when the gap between the splined shaft ends 13 and 15 is too great to provide an effective splined connection with the wheels 18, 19 of the reduction gear.

In some tractors of the kind set forth, and as shown in Figures 1 and 2, there is also normally provided, in the region of the splined sleeve 14, a control 26 for a clutch (indicated generally at 27 in the drive to a pump for the supply of a hydraulic fluid, for example, to a lifting mechanism (not shown) for an implement to be associated with the tractor.

In the example shown the control has a finger 28, working through a slot 29 in a part of the clutch housing, and spaced grooves 30 for coaction with a spring-pressed ball for locating it in its two alternative positions. In some instances, this control is so disposed as to obstruct the placing in position of the reduction gearing of the invention. To avoid that the said control is removed from its normal position and is mounted on a stationary part (e. g., one of the said end plates 21, 22) of the reduction gearing.

Thus, in Figure 3, the finger (marked 28a) is fast with a sleeve 31 which can slide on a peg 32 fast with the end plate 21. The locating ball is, in this case, carried by the sleeve, and the peg 32 has the two grooves, which are marked 30a. The cranked connection of the finger to the sleeve passes clear of the end plate 21 (as shown by Figure 5).

There is an annular groove 34 in a boss 35 fast with the slidable wheel 18 and the groove is for engagement by a gear shifting fork 36. The latter is carried by a sleeve 37 which can be slid, on a peg 38 fast with the end plate 21, by a control (not shown) into two alternative positions in which latter it is located by the spring-pressed ball 39 (Figure 5) and one or other of the grooves 40.

For adapting a tractor, of the kind set forth and designed for a minimum speed of, say, 2½ miles per hour, for use with a rotary cultivator, the reduction gearing may be proportioned so as to reduce the minimum speed to approximately 0.7 of a mile per hour. Obviously, however, the reduction gearing could be so proportioned as to provide for another desired minimum speed, which is less than the designed minimum speed of the unmodified tractor, according to the use to which the tractor is to be put.

What I claim as my invention and desire to secure by Letters Patent of the United States is:

1. For use with a tractor having a transmission, an output shaft extending from the transmission and having a splined end, a differential gearing and an input shaft for said gearing aligned with and spaced in end to end fashion from said output shaft and having a spline end; an auxiliary transmission adapted to drivingly connect said shafts and including a pair of mounting plates fixed in longitudinally spaced fashion transversely of the shafts, a first gear slidably disposed on the spline end of said input shaft and having a sleeve end, one of said plates having an opening slidably supporting the sleeve end of the gear with the gear disposed adjacent the inner face of the plate and the other plate supporting the splined end of the output shaft and having an opening receiving the end, a second gear mounted on said end of the output shaft at the inner face of said plate, a layshaft journalled in said plates parallel with said input and output shafts, gears on said layshaft adapted to mesh with the first and second gears to provide a travel speed reduction, said first and second gears having interengageable end surfaces to couple the input and output shafts directly together, and means for shifting said slidable second gear axially of its shaft.

2. For use with a tractor having a transmission, an output shaft extending from the transmission and having a splined end, a differential gearing and an input shaft for said gearing aligned with and spaced in end to end fashion from said output shaft and having a splined end; an auxiliary transmission adapted to drivingly connect said shafts and including a pair of mounting plates fixed in longitudinally spaced fashion transversely of the shafts, a first gear slidably disposed on the spline end of said input shaft and having a sleeve end, one of said plates having an opening slidably supporting the sleeve end of the gear with the gear disposed adjacent the inner face of the plate and the other plate supporting the splined end of the output shaft and having an opening receiving the end, a second gear mounted on said end of the output shaft at the inner face of said plate, a layshaft journalled in said plates parallel with said input and output shafts, gears on said layshaft adapted to mesh with the first and second gears to provide a travel speed reduction, said first and second gears having interengageable end surfaces to couple the input and output shafts directly together, and means for shifting said slidable second gear axially of its shaft, said last means including a rod fixed at one end to the first end plate and extending therefrom paralleling and overlying the input shaft, a sleeve axially slidable on the rod, a finger carried laterally by the sleeve and connected to the second gear and locking means between said rod and sleeve.

ARTHUR CLIFFORD HOWARD.

REFERENCES CITED

The following references are of record in the file of this patent:

UNITED STATES PATENTS

| Number | Name | Date |
|---|---|---|
| Re. 17,707 | Maybach | June 24, 1930 |
| 2,241,764 | Bollinger | May 13, 1941 |
| 2,445,716 | Steinberg | July 20, 1948 |
| 2,487,735 | Sherman | Nov. 8, 1949 |

FOREIGN PATENTS

| Number | Country | Date |
|---|---|---|
| 560,445 | Great Britain | Apr. 4, 1944 |